(12) United States Patent
Boeker et al.

(10) Patent No.: US 7,835,075 B2
(45) Date of Patent: Nov. 16, 2010

(54) REPLACEMENT DEVICE FOR MICROSCOPES

(75) Inventors: Christian Boeker, Gleichen (DE); Hans Tandler, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 500 days.

(21) Appl. No.: 11/631,707

(22) PCT Filed: Jul. 2, 2005

(86) PCT No.: PCT/EP2005/007154

§ 371 (c)(1),
(2), (4) Date: Jan. 5, 2007

(87) PCT Pub. No.: WO2006/002961

PCT Pub. Date: Jan. 12, 2006

(65) Prior Publication Data

US 2008/0084606 A1    Apr. 10, 2008

(30) Foreign Application Priority Data

Jul. 6, 2004    (DE) .................. 10 2004 032 556

(51) Int. Cl.
*G02B 21/00*    (2006.01)

(52) U.S. Cl. ............ 359/381; 359/368; 359/380

(58) Field of Classification Search ......... 359/368–384, 359/819, 821

See application file for complete search history.

(56) References Cited

U.S. PATENT DOCUMENTS

| | | | |
|---|---|---|---|
| 3,064,529 A * | 11/1962 | Straat | ............ 359/384 |
| 3,930,712 A | 1/1976 | Boughton et al. | |
| 4,283,111 A * | 8/1981 | Wieber et al. | ............ 359/381 |
| 4,999,495 A | 3/1991 | Miyata et al. | |
| 5,337,177 A * | 8/1994 | Toyoda et al. | ............ 359/384 |
| 5,508,850 A * | 4/1996 | Noguchi | ............ 359/821 |
| 6,366,398 B1 * | 4/2002 | Ouchi | ............ 359/381 |
| 6,384,992 B1 | 5/2002 | Weiss | |
| 6,683,735 B2 | 1/2004 | Stuckey | |
| 2001/0003489 A1 | 6/2001 | Shiba et al. | |

FOREIGN PATENT DOCUMENTS

| | | |
|---|---|---|
| DE | 23 51 455 | 11/1985 |
| DE | 36 27 185 | 5/1987 |
| DE | 102 35 388 | 2/2004 |
| EP | 1 093 002 | 9/2000 |

OTHER PUBLICATIONS

Patent Abstracts of Japan: Publication No. 08136818 published May 31, 1996, Optical Microscope / Olympus Optical Co. Ltd.

* cited by examiner

*Primary Examiner*—Thong Nguyen
(74) *Attorney, Agent, or Firm*—Frommer Lawrence & Haug LLP

(57) ABSTRACT

A changing device for receiving optical elements, particularly for microscopes, has a stand comprising a side wall, front wall and rear wall. This changing device is arranged at a holder in the telecentric part of the microscope beam path and is outfitted with a quantity of optical components influencing the beam path. The arrangement is mounted so as to be rotatable around an axis of rotation which is situated in the holder and which intersects the optical axis of the microscope beam path.

3 Claims, 2 Drawing Sheets

REPLACEMENT DEVICE FOR MICROSCOPES

CROSS-REFERENCE TO RELATED APPLICATIONS

This application claims priority of International Application No. PCT/EP2005/007154, filed Jul. 2, 2005 and German Application No. 10 2004 032 556.1, filed Jul. 6, 2004, the complete disclosures of which are hereby incorporated by reference.

BACKGROUND OF THE INVENTION a) Field of the Invention

The invention is directed to a changing device for receiving optical elements, particularly for microscopes, for implementing incident illumination of specimens or objects and for observation thereof through appropriate shaping and guiding of the beam path by beam splitting and/or beam deflection.

b) Description of the Related Art

Reflector slides which are preferably arranged in the telecentric part of the microscope beam path are known for this purpose in microscopes. With regard to pixel-exact imaging of the object on the CCD matrix of a CCD camera, this reflector slide has drawbacks, including that the object or specimen can easily be put out of alignment with respect to the optical axis because of the end stops of the slide in the guide. In particular, for example, sequential recordings of objects or specimens with different wavelengths can then only be brought into coincidence by corresponding software, which requires increased resources.

In microscope applications requiring the greatest possible accessibility for manipulators and other tools for influencing or manipulating the object, the space above the object is often subject to especially restrictive requirements. It must be as free and accessible as possible so that work can be conducted without hindrance and the object can be manipulated. One such requirement, for example, provides for the use of up to five manipulators which extend in direction of the objective at 45° to the horizontal plane and which must be operated in a corresponding manner. These manipulators, which are applied from the front and sides, limit the available space for a required objective changing device, for example, and for possible illuminator components in such a way that, depending on the distance from the object, certain width dimensions and distances from the perpendicularly extending optical axis of the microscope may not be exceeded or must be adhered to.

DE 102 35 388.3 proposes an optical arrangement with a telecentric beam path, e.g., a microscope arrangement, which comprises an objective imaging at infinity, at least one eyepiece, and a tube lens which is arranged between the objective and the eyepiece at a fixed distance from the objective. A telecentric, i.e., parallel, beam path exists in the space between the objective and the tube lens. Arranged in this portion of the beam path are, for example, beamsplitters or other optical components which are arranged in a turret and can be introduced into the beam path.

EP 1 093 002 A2 discloses an apparatus for changing objectives in microscopes which ensures that, for example, the manipulators or objects or specimens which are to be observed or manipulated are protected against damage when changing objectives. This is achieved by providing an objective turret carrying objectives which is rotatable around an axis at an inclination with respect to the optical axis of the microscope beam path. The objective turret of the microscope is arranged so as to be laterally offset and this offset is defined with respect to one side wall of the microscope stand. Due to this offset of the turret and the resulting inclination and positioning of the axis of rotation of the turret, a substantially linear motion from the front wall to the rear wall of the microscope stand is generated in the region of the work position of the objectives when changing objectives.

This apparatus is directed only to a well-known objective turret in which other optical elements which influence the beam path cannot be arranged.

A quick-changing device for dichroic beamsplitters in fluorescence microscopes is described in U.S. Pat. No. 6,683,735 B2. A disk which is rotatable around an axis and comprises the individual beamsplitters and filters is provided in the microscope beam path. The disk is driven by a motor which is controlled by a computer. The required splitters and filters can be introduced into the beam path of the microscope by displacing the disk. However, this device has a drawback that should not be underestimated. The disk occupies a relatively large amount of space in the region of the beam path because the diameter of the disk must have relatively large dimensions in order to accommodate the splitters and filters.

OBJECT AND SUMMARY OF THE INVENTION

Therefore, it is primary the object of the invention to provide a changing device for microscopes which substantially overcomes the disadvantages of the prior art and which provides unimpeded access to the space above the object and therefore allows unhindered manipulation in this space.

According to the invention, this object is met by a changing device for receiving optical elements, particularly for microscopes, having a stand comprising a side wall, a front wall, a rear wall, a stand head and a stand base. The changing device is arranged at a holder in the telecentric part of the microscope beam path and is outfitted with a quantity of optical components influencing the beam path. The changing device is outfitted so as to be rotatable around an axis of the beam path. The changing device is mounted so as to be rotatable around an axis of rotation which is provided in the holder and which intersects the optical axis of the microscope beam path and which lies in the plane of symmetry of the microscope and which, along with optical axes of beam paths existing in the microscope, lies in a plane extending substantially perpendicular to the front wall of the microscope stand. The part of the changing device which is not located in the microscope beam path and which lies diametrically opposite from the part of the changing device that is located in the beam path is arranged so as to be directed toward the microscope stand and adjacent to the front wall of the microscope stand.

It is advantageous when the axis of rotation of the changing device and the optical axis of the microscope beam path intersect and define a plane which extends substantially perpendicular to the plane of the front wall and rear wall of the microscope stand.

In an advantageous construction, the holder carrying the device is arranged at the stand head or directly at the microscope stand.

This special arrangement of the changing device is also advantageous, above all, in that the front portion of the microscope stand remains free for the arrangement of manipulators.

The invention will be described more fully in the following with reference to an embodiment example.

DESCRIPTION OF THE PREFERRED EMBODIMENTS

Figure 1:
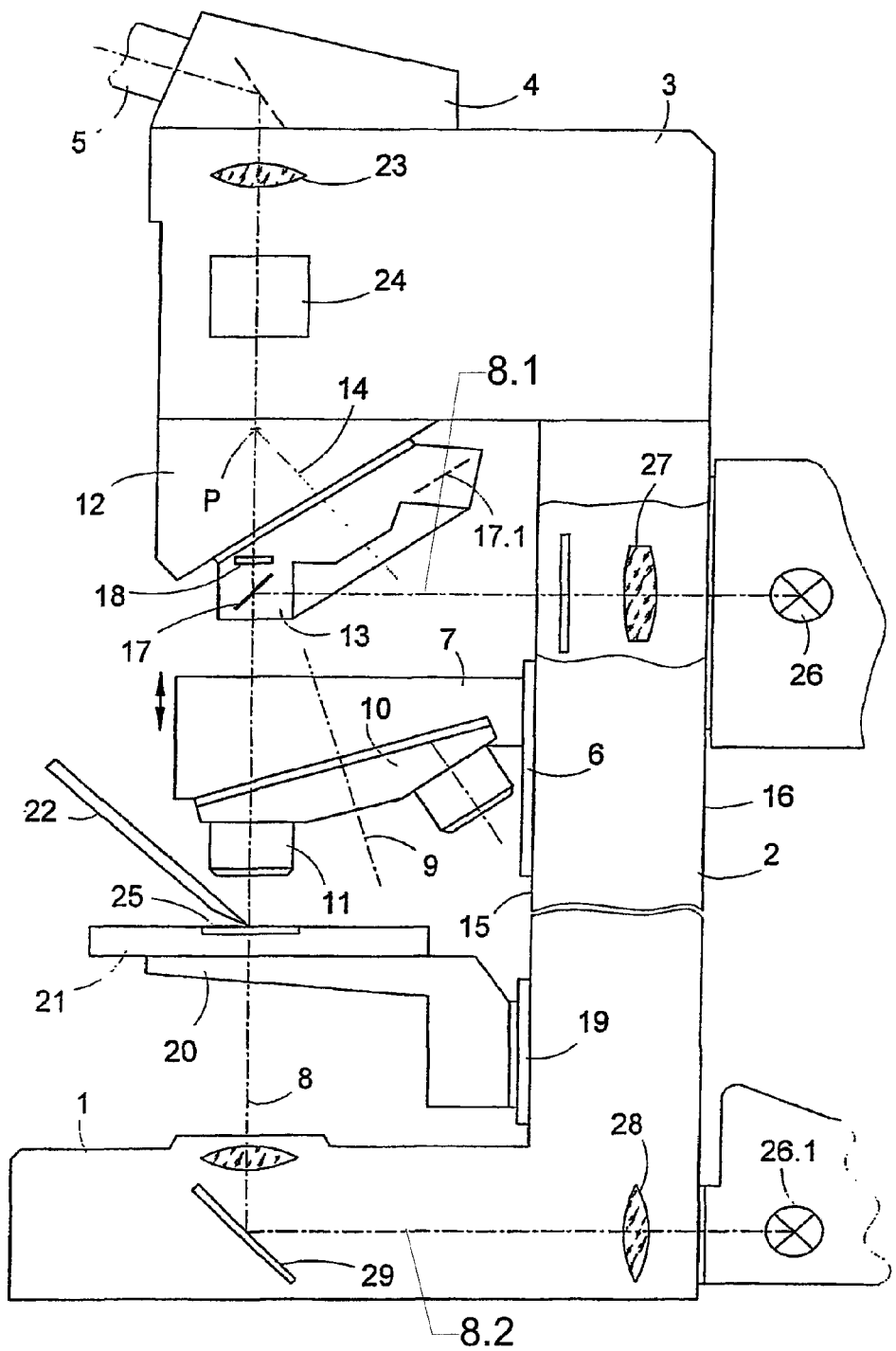
FIG. 1 shows a schematic side view of an upright microscope with a changing device.
Figure 2:
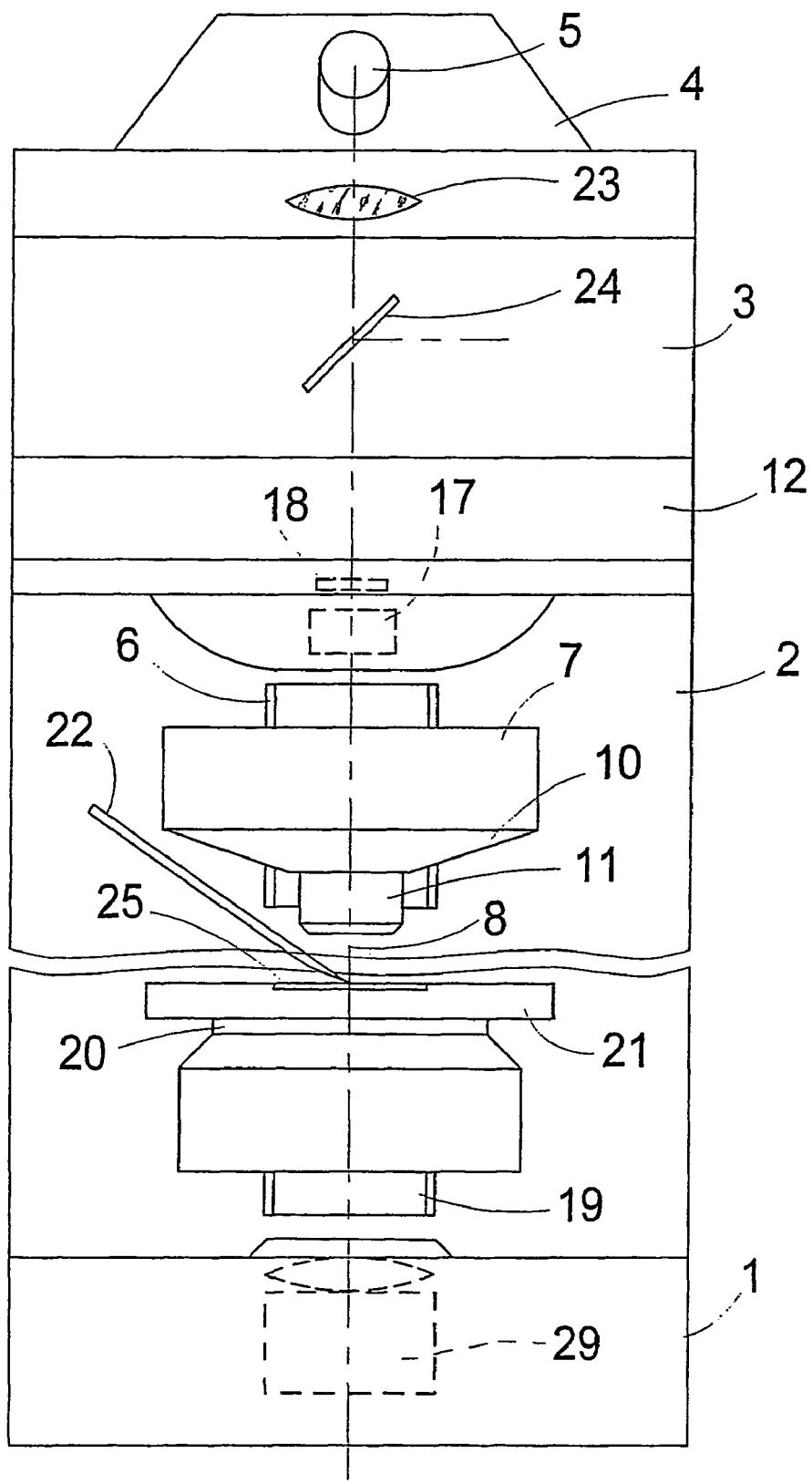
FIG. 2 shows a front view of the microscope according to FIG. 1.

The microscope which is shown in simplified form in FIGS. 1 and 2 as an upright microscope comprises a housing which is formed substantially of a microscope base 1, a microscope stand 2 and a stand head 3 that is arranged at the upper end of the stand 2. An eyepiece carrier 4 with an eyepiece 5 is located on the stand head 3. Other devices, e.g., photographic devices, can also be arranged on the stand head 3. Further, an objective slide 7 is arranged at the stand 2 on guides 6, preferably so as to be displaceable in direction of the optical axis 8 of the microscope beam path. An objective turret 10 with different objectives 11 which is displaceable around an axis of rotation 9 extending at an inclination to the optical axis 8 is provided at the objective slide 7 in a manner known per se. By rotating the objective turret 10 around its axis of rotation 9, the objectives 11 required for the task at hand can be introduced into the microscope beam path.

Further, a preferably exchangeable holder 12 is provided at the bottom portion of the stand head 3, above the objective slide 7 in the embodiment example according to FIGS. 1 and 2. The changing device 13 according to the invention which is constructed, e.g., as a turret arrangement and which is rotatable around an axis of rotation 14 is arranged above the objective slide 7. This axis of rotation 14 and the optical axis 8 of the beam path intersect at a point P and define a plane which extends substantially perpendicular to the plane of the front wall 15 and rear wall 16 of the microscope stand 2. The plane defined by the axis of rotation 14 and the optical axis 8 advantageously lies in the plane of symmetry of the microscope. For example, reflectors 17; 17.1, reflector cubes, a wide variety of optical filters 18, or other suitable optical elements influencing the microscope beam path can be arranged individually or in combination in this changing device 13. These elements are arranged in the telecentric or parallel part of the microscope beam path, usually between the respective objective 11 located in the beam path and a tube lens 23 which is usually provided in the stand head 3 (in upright microscopes).

A holder 20 for an object stage 21 on which the object 25 or specimen to be examined and/or observed are/is arranged is provided at the microscope stand below the objective slide 7 and is preferably displaceable on guides 19 in direction of the optical axis 8. Manipulators 22 or other suitable tools which must have extensive and unimpeded access to the object 25 from a number of directions through the turret arrangement according to the invention so as to ensure comprehensive manipulation of the object 25 are provided at the microscope for manipulating the object 25.

Further, means, e.g., in the form of one or more beamsplitter cubes 24, for blending in or blending out additional beam paths can be arranged in the stand head 3 likewise in the telecentric area of the microscope beam path. Filters and/or other optical elements influencing the beam path can also be introduced into the beam path (not shown in FIGS. 1 and 2).

FIG. 1 also shows that, for example, another illumination beam path 8.1 is provided in the center portion of the microscope stand 2 with a light source 26 and a lens 27. This illumination beam path can be used, for example, for incident illumination of the object 25. An illumination beam path 8.2 with a light source 26.1, a lens 28 and a deflecting element 29 which can be provided for transmitted illumination are located in the microscope base 1 in an analogous manner.

The holder 12 at which the changing device 13 is arranged so as to be rotatable can also be mounted so as to be displaceable, for example, on a guide which is provided at the microscope stand 2 and which extends in direction of the optical axis 8. In this regard, it is important only that the changing device 13 is located in the telecentric portion of the microscope beam path. This construction of the invention is not shown in FIGS. 1 and 2 for the sake of simplicity.

The invention has been described in connection with a particular embodiment form. However it will be self-evident to the person skilled in the art that changes and modifications can be made without departing from the protected scope of the appended claims.

REFERENCE NUMBERS 1 microscope base
2 microscope stand
3 stand head
4 eyepiece carrier
5 eyepiece
6 guide
7 objective slide
8 optical axis
8.1 illumination beam path
8.2 illumination beam path
9 axis of rotation
10 objective turret
11 objective
12 holder
13 turret arrangement
14 axis of rotation
15 front wall
16 rear wall
17 reflector
17.1 reflector
18 filter
19 guide
20 holder
21 object stage
22 manipulator
23 tube lens
24 beamsplitter cube
25 object
26 light source
26.1 light source
27 condenser lens;
28 condenser lens
29 deflecting element

The invention claimed is:

1. A microscope comprising:
   an objective turret;
   a stand, the stand comprising:
      a side wall;
      a front wall;
      a rear wall;
      a stand head; and
      a stand base; and
   a changing device for receiving optical filters,
   said changing device being arranged at a holder in a telecentric part of a microscope beam path and being outfitted with a quantity of optical filters influencing the beam path;
   said changing device being mounted so as to be rotatable around an axis of rotation which is provided in the holder and which intersects an optical axis of the microscope beam path and which lies in the plane of symmetry of a microscope and which, along with optical axes of beam paths existing in the microscope, lies in a plane extending substantially perpendicular to the front wall of the microscope stand; and the part of the changing device which is not located in the microscope beam path and which lies diametrically opposite from the part of the changing device that is located in the beam path being arranged so as to be directed toward the microscope stand and adjacent to the front wall of the microscope stand.

2. The changing device according to claim 1, wherein the axis of rotation of the changing device and the optical axis of the microscope beam path intersect and define a plane which extends substantially perpendicular to the plane of the front wall and rear wall of the microscope stand.

3. The changing device according to claim 1,
wherein the holder carrying the changing device is arranged at the stand head or at the microscope stand.

* * * * *